United States Patent
Pascotti et al.

[11] Patent Number: 6,029,568
[45] Date of Patent: Feb. 29, 2000

[54] JUICER WITH SERVO CONTROL INDUCTION MOTOR

[75] Inventors: James Pascotti, Harrisburg, Pa.; B. S. Kim, Pusan, Rep. of Korea

[73] Assignee: L'Equip, Inc., Lemoyne, Pa.

[21] Appl. No.: 09/348,107

[22] Filed: Jul. 6, 1999

[51] Int. Cl.[7] .............................. A23N 1/00; A23N 1/02; A47J 43/046; A47J 43/07; A23L 1/00

[52] U.S. Cl. ............................... 99/489; 99/492; 99/511; 99/513; 241/37.5; 241/92; 241/282.1; 366/314; 366/601

[58] Field of Search ............................ 99/486, 489, 492, 99/509–513; 210/380.1; 241/278.1, 282.1, 282.2, 37.5, 92, 199.12, 101.2, 260.1, 86; 366/206, 601, 205, 318, 314; 426/61, 63, 49, 52, 533, 599, 640

[56] References Cited

U.S. PATENT DOCUMENTS

| | | | |
|---|---|---|---|
| 362,597 | 9/1995 | Kim | D7/665 |
| 376,736 | 12/1996 | Kim | D7/665 |
| 4,096,420 | 6/1978 | Gosling et al. | 318/254 |
| 4,345,517 | 8/1982 | Arao et al. | 99/511 |
| 4,350,087 | 9/1982 | Ramirez | 99/513 X |
| 4,417,190 | 11/1983 | Nola | 318/729 |
| 4,506,601 | 3/1985 | Ramirez et al. | 99/511 |
| 4,614,153 | 9/1986 | Kurome et al. | 99/513 X |
| 4,681,031 | 7/1987 | Austad | 99/511 |
| 4,700,621 | 10/1987 | Elger | 99/513 X |
| 4,716,823 | 1/1988 | Capdevila | 241/282.2 |
| 5,254,474 | 10/1993 | Kim | 436/131 |
| 5,257,575 | 11/1993 | Harrison et al. | 99/513 X |
| 5,267,638 | 12/1993 | Doane | 198/357 |
| 5,334,924 | 8/1994 | Kawada et al. | 318/811 |
| 5,355,704 | 10/1994 | Franklin et al. | 99/492 |
| 5,355,784 | 10/1994 | Franklin et al. | 99/492 |
| 5,381,730 | 1/1995 | Kim | 99/510 |
| 5,396,836 | 3/1995 | Kim | 99/510 |
| 5,479,851 | 1/1996 | McClean et al. | 210/360.1 X |
| 5,495,795 | 3/1996 | Harrison et al. | 241/37.5 X |
| 5,662,032 | 9/1997 | Baratta | 366/314 X |
| 5,723,966 | 3/1998 | Straka et al. | 318/650 |
| 5,806,413 | 9/1998 | Trovinger | 366/601 X |

*Primary Examiner*—Timothy Simone
*Attorney, Agent, or Firm*—Duane, Morris & Heckscher, LLP

[57] ABSTRACT

A juice extractor is provided that includes an induction motor supported by a housing and having a rotatable shaft that is operably interconnected with comminuting basket adapted to pulverize food products, e.g., fruit and/or vegetables, into juice bearing pulp. The comminuting basket extracts the juice from the pulp and ejects the juiceless pulp. A servo-control mechanism is arranged in electrical and controlling cooperation with the induction motor, and is responsive to the rate of rotation of the shaft for maintaining the shaft at a substantially constant rate of rotation when the induction motor is in a power-on state and the comminuting basket is comminuting the food products. A bowl is positioned in substantially surrounding relation to the comminuting basket so as to (i) collect the juice and (ii) direct the juice to an exit opening in the bowel. A cover is releasably clamped to the collection bowl, and has a contour that provides a pathway for directing pulp ejected by the comminuting basket into a receptacle. A novel trash bag clamp and bowel shape are also provided.

19 Claims, 13 Drawing Sheets

JUICER WITH SERVO CONTROL INDUCTION MOTOR

FIELD OF THE INVENTION

The present invention generally relates to vegetable and fruit juice extracting apparatus and more particularly to an electrically driven apparatus for comminuting raw vegetables or fruit into a pulp, straining the juice from the comminuted pulp and depositing the juice and pulp in separate containers.

BACKGROUND OF THE INVENTION

Vegetable and fruit juice extractors, also known as "juicers", are well-known in the art. For example, U.S. Pat. No. 4,350,087, issued to Ramirez; U.S. Pat. No. 4,345,517, issued to Arao et al.; U.S. Pat. No. 4,506,601, issued to Ramirez et al.; U.S. Pat. No. 4,614,153, issued to Kurome et al.; U.S. Pat. No. 4,681,031, issued to Austad; U.S. Pat. No. 4,700,621, issued to Elger; U.S. Pat. No. 4,716,823, issued to Capdevila; and U.S. Pat. No. 5,355,784, issued to Franklin et al., disclose a variety of juicers for use in both home and commercial settings.

Typically, such prior art juicers consist of a rotating cutting disk by which fruits and vegetables are a comminuted, i.e., pulverized into a pulp. The rotating cutting disk is normally formed as a portion of a basket or container which, by centrifugal force acting on the juice and pulp, receives and separates the juice and pulp. The juice is drawn out by the centrifugal forces exerted by the rotating disk and basket, with the pulp being either collected in the basket or discharged to some other container.

Various problems have been encountered in the art related to juicing of fruits and/or vegetables, pulp removal, efficient separation of pulp and juice at high rates, as well as other problems regarding efficiency of juice extraction. In particular, many prior art juicers have suffered from inefficient, underpowered motor systems. In some juicers, the simultaneous introduction of large quantities of fruits and/or vegetables into the rotating blade and basket assembly causes the blade to slow, or even to stop, as a result of the frictional forces created by the interaction of the fruits and/or vegetables and the rotating cutting disk. This overloading of the cutting disk and motor causes an inconvenience for the operator, and in some cases may lead to permanent damage to the juicer. Motors have been "burned-out" due to the operator insisting upon forcing large quantities of fruits and/or vegetables into the cutting disk and thus stopping the motor while it is still powered. Such stoppage also greatly reduces the efficiency of the juicing operation. This is particularly important in a commercial setting, where fast and efficient juicing is required to satisfy customer demand.

There has also been a long felt need for an efficient means of disposing of the pulp. In the art, juicers are known which eject the pulp from the rotating blade and basket assembly into an adjacent container. This adjacent container is normally the same size as the juicer, i.e., a size suitable for counter top use. As a result, these prior art containers fill rapidly, requiring frequent unloading into a trash receptacle. Each time the pulp container is filled, the juicing operation must stop while the pulp container is removed, cleaned-out, and returned to the juicer. This creates an unacceptable delay in the process, especially in commercial operations.

A further significant problem associated with prior art juicers is the over "oxygenation" of the juice, due to agitation of the juice during and after extraction from the pulp. The over oxygenation of the juice tends to reduce its vitamin and enzyme content (due to oxidation), significantly reducing its nutritional benefits.

As a consequence, there has been a long felt need for a juicer having a motor which will not stop when large quantities of fruits and/or vegetables are forced into contact with the cutting blades of the juicer. Another need is for an easy and efficient way of disposing of large quantities of pulp without having to cease operation of the juicer in order to empty a pulp container. In addition, there has been a long felt need for a juicer which minimizes the oxygenation of the juice during and after juice extraction.

SUMMARY OF THE INVENTION

The present invention provides a juice extractor comprising an induction motor supported by a housing and having a rotatable shaft that is operably interconnected with means for comminuting food products so as to pulverize the food products, e.g., fruit and/or vegetables, into juice bearing pulp. The comminuting means extract the juice from the pulp and eject the juiceless pulp. A servo-control mechanism is arranged in electrical and controlling cooperation with the induction motor, and is responsive to the rate of rotation of the shaft for maintaining the shaft at a substantially constant rate of rotation when the induction motor is in a power-on state and the comminuting means are comminuting means so as to (i) collect the juice (ii) direct the juice to an exit opening in the bowel. A cover is releasably clamped to the collection bowl, and has a contour that provides a pathway for directing pulp ejected by the comminuting means into a receptacle.

BRIEF DESCRIPTION OF THE DRAWINGS

These features and advantages of the present invention will be more fully disclosed in, or rendered by obvious by, the following detailed description of the preferred embodiments of the invention, which are to be considered together with the accompanying drawings wherein like numbers refer to light parts and further wherein.

DETAILED DESCRIPTION OF THE PREFERRED EMBODIMENTS

The following description of the preferred embodiments of the invention are intended to be read in connection with the foregoing drawings and are to be considered a portion of the entire written description of this invention. As used in the following description, terms such as, "horizontal", "vertical", "left", "right", "up", and "down", as well as adjectival and adverbial derivatives thereof (e.g., "horizontally", "rightwardly", "upwardly", downwardly", etc.) simply refer to the orientation of the structure of the invention as it is illustrated in the particular drawing figure when that figure faces the reader. Similarly, the terms "inwardly" and "outwardly" generally refer to the orientation of a surface relative to its axis of elongation, or axis of rotation, as appropriate. Also, the terms "connected" and "interconnected", when used in this disclosure to describe the relationship between two or more structures, means that such structures are secured or attached to each other either directly or indirectly through intervening structures and includes pivotal connections. The term "operatively" means that the foregoing direct or indirect connection between the structures allows such structures to operate as intended by virtue of such connection.

Referring to FIGS. 1–5, a juicer 5 with servo-controlled induction motor formed according to a preferred embodiment of the present invention generally comprises a support assembly 100 and a pulping assembly 200. More particularly, support assembly 100 comprises a base housing 102, a collection bowl 104, a cover 106, and a pulp receptacle 108. Base housing 102 is formed from a polymer that is suitable for use with consumables, such as fruits, vegetables, or the like, and includes a side wall 114, a top wall 116, and a bottom wall 118. Side wall 114 is substantially frusto-conical, and is sized and shaped to contain and support pulping assembly 200. Diametrically opposed recesses 117 in the outer surface of side wall 114 are provided to accept pivoting latch arms 119 that are adapted to clamp onto cover 106, as will hereinafter be disclosed in further detail.

Top wall 116 comprises a substantially circular disk having an upper surface, a lower surface, and a central through-bore 122. The upper surface of top wall 116 includes an upwardly projecting, peripheral shoulder 124 that is adapted for supporting collection bowl 104 when the juicer is fully assembled. A central recess 126 is annularly disposed around central bore 122. An annular shoulder 128 surrounds central recess 126. The lower surface of top wall 116 includes a bottom wall mount 130, a motor mount 132, and a bearing housing 134. Bottom wall mount 130 and motor mount 132 project downwardly from the lower surface of top wall 116, and are adapted to receive screws 135 or the like to secure bottom wall 118 to base housing 102. Bearing housing 134 projects downwardly from the lower surface of top wall 116, and is adapted to receive a conventional ball bearing assembly for use in connection with pulping assembly 200, as will hereinafter be disclosed in further detail.

Bottom wall 118 comprises an upper surface and a lower surface. The upper surface of bottom wall 118 includes an upwardly projecting housing mount 138 that is adapted to engage a portion of bottom wall mount 130. The lower surface includes footpad mounts 137 and footpads 139. Footpads 139 are positioned within footpad mounts 137 and attached thereto by screws, bolts, or the like. Footpads 139 comprise a highly frictional material, such as rubber or elastomeric polymer, so as to prevent juicer 5 from sliding from a work surface, such as a counter top or the like.

Still referring to FIGS. 1–5, collection bowl 104 is formed from a material that is suitable for contact with food products, such as stainless steel, or any of the well-known polymer materials used in the food preparation arts. Collection bowl 104 comprises a vessel having an outer annular wall 141, an inner annular wall 143, and an annular base 145. Outer wall 141 defines a central through opening 142 that is sized to receive portions of pulping assembly 200, as will hereinafter be disclosed in further detail.

Outer wall 141 of collection bowl 104 comprises a radially outward curvature having an inwardly projecting seat 147 and a cylindrical lip 149 disposed at a top edge. Preferably, outer wall 141 is curved about a center point that defines a radius of about 45 millimeters (mm) to about 55 mm, and best results are currently obtained with a radius of about 47 mm. A spout 150 projects outwardly from a lower portion of the outer surface of outer wall 141. Spout 150 is disposed in open communication with the interior of collection bowl 104. The length of spout 150 is optional, and is normally chosen to be convenient for use in connection with juice collection containers, such as glasses, measuring cups, or the like.

Inner wall 143 of collection bowl 104 projects upwardly and inwardly, toward opening 142, from an edge of base 145, at an angle in the range from about 45 degrees to about 55 degrees, and at a preferred angle of about 52 degrees relative to base 145. A cylindrical lip 151 projects upwardly from the free end of inner wall 143. Base 145 extends between the lower edge of outer wall 141 and the lower edge of inner wall 143 so that a relatively broad annular trough 152 is defined by the inner surfaces of outer wall 141, inner wall 143, and base 145. Advantageously, trough 152 and curved outer wall 141 are sized and shaped to minimize oxygenation of the liquids produced during juicing. This reduction in oxygenation is effected by the specific curvature of outer wall 141, which collects and directs the juice (created in pulping assembly 200) toward spout 150 without significant agitation.

Figure 1:
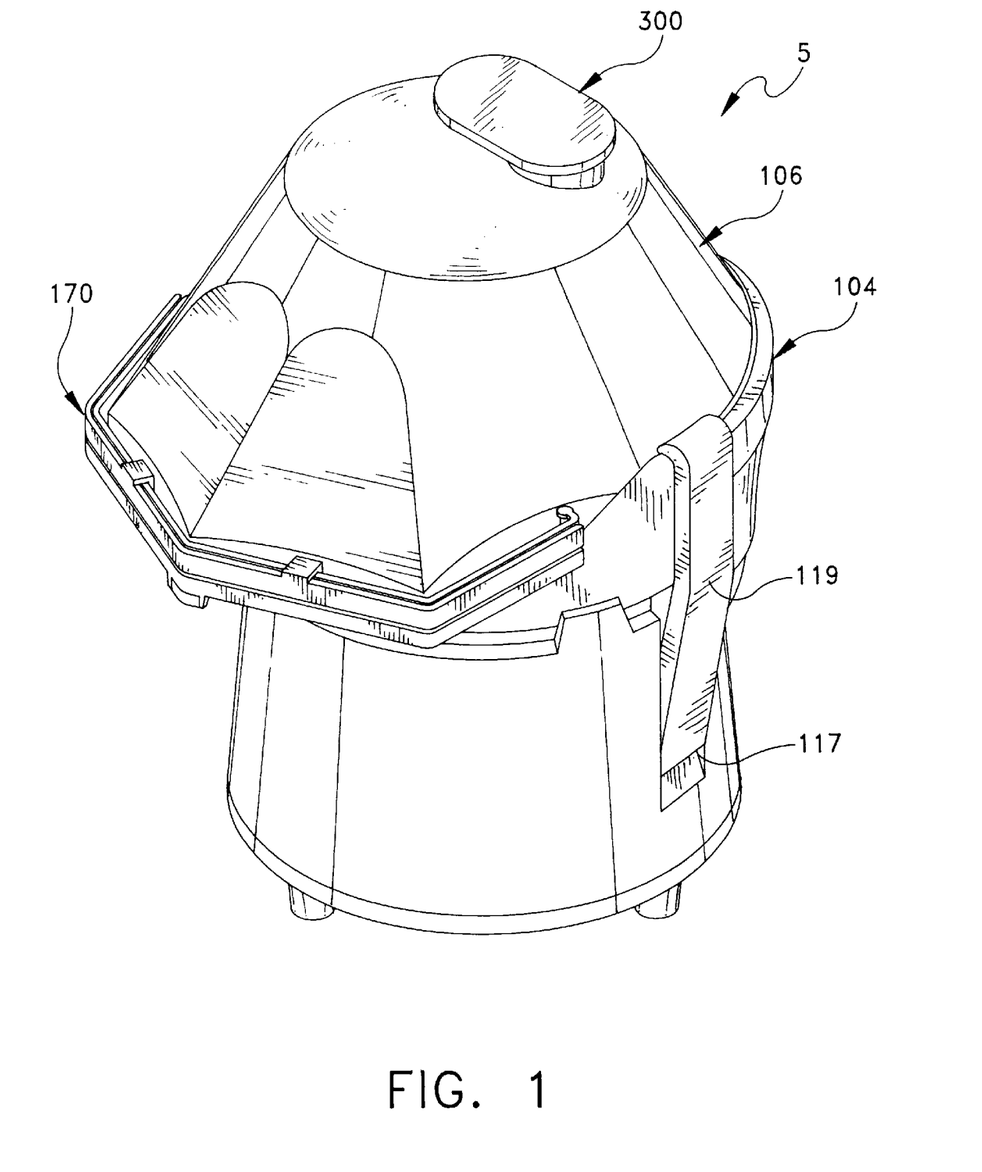
FIG. 1 is a perspective view of an assembled juicer formed in accordance with the present invention.
Figure 2:
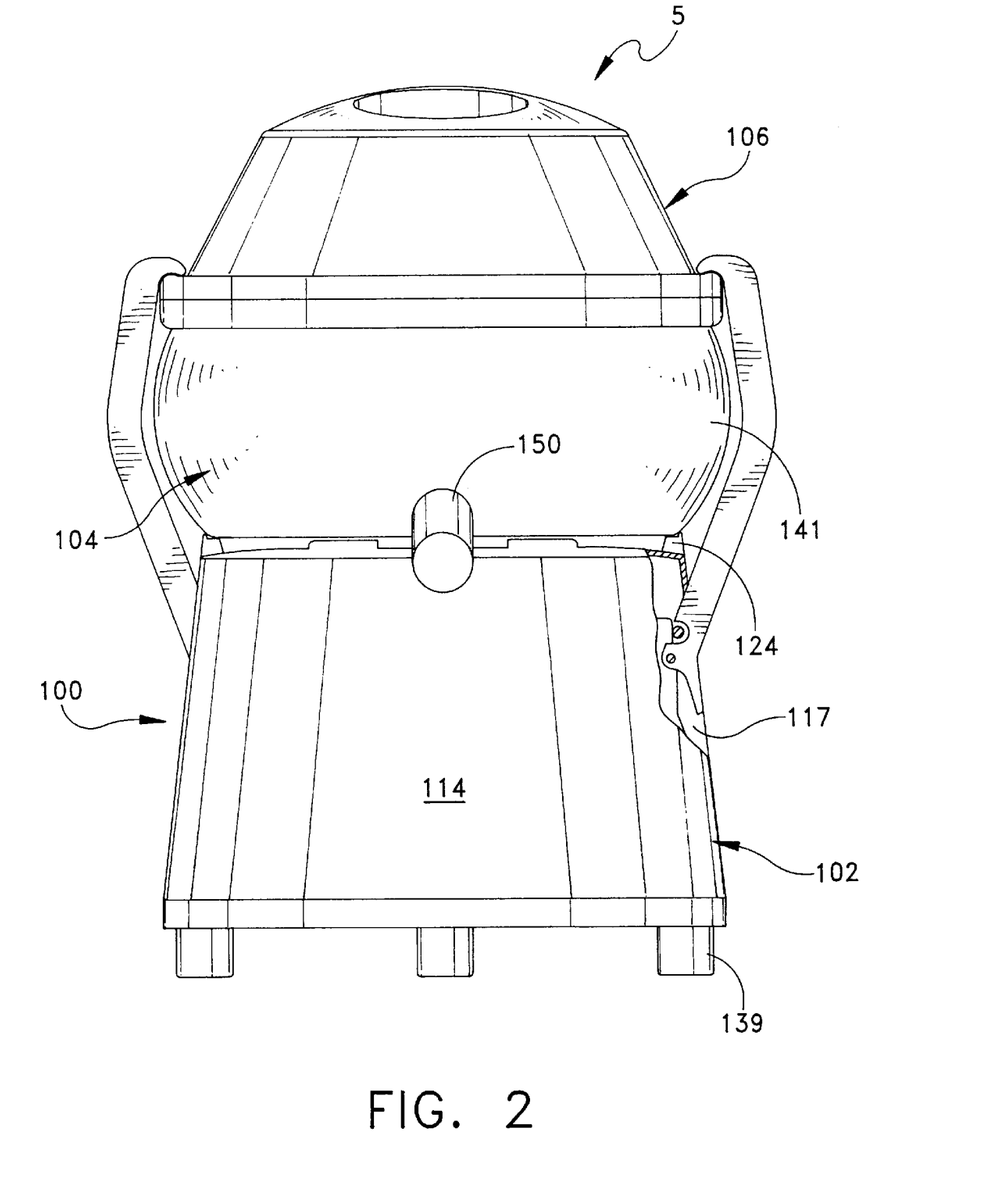
FIG. 2 is a front elevational view of the juicer shown in FIG. 1.
Figure 3:
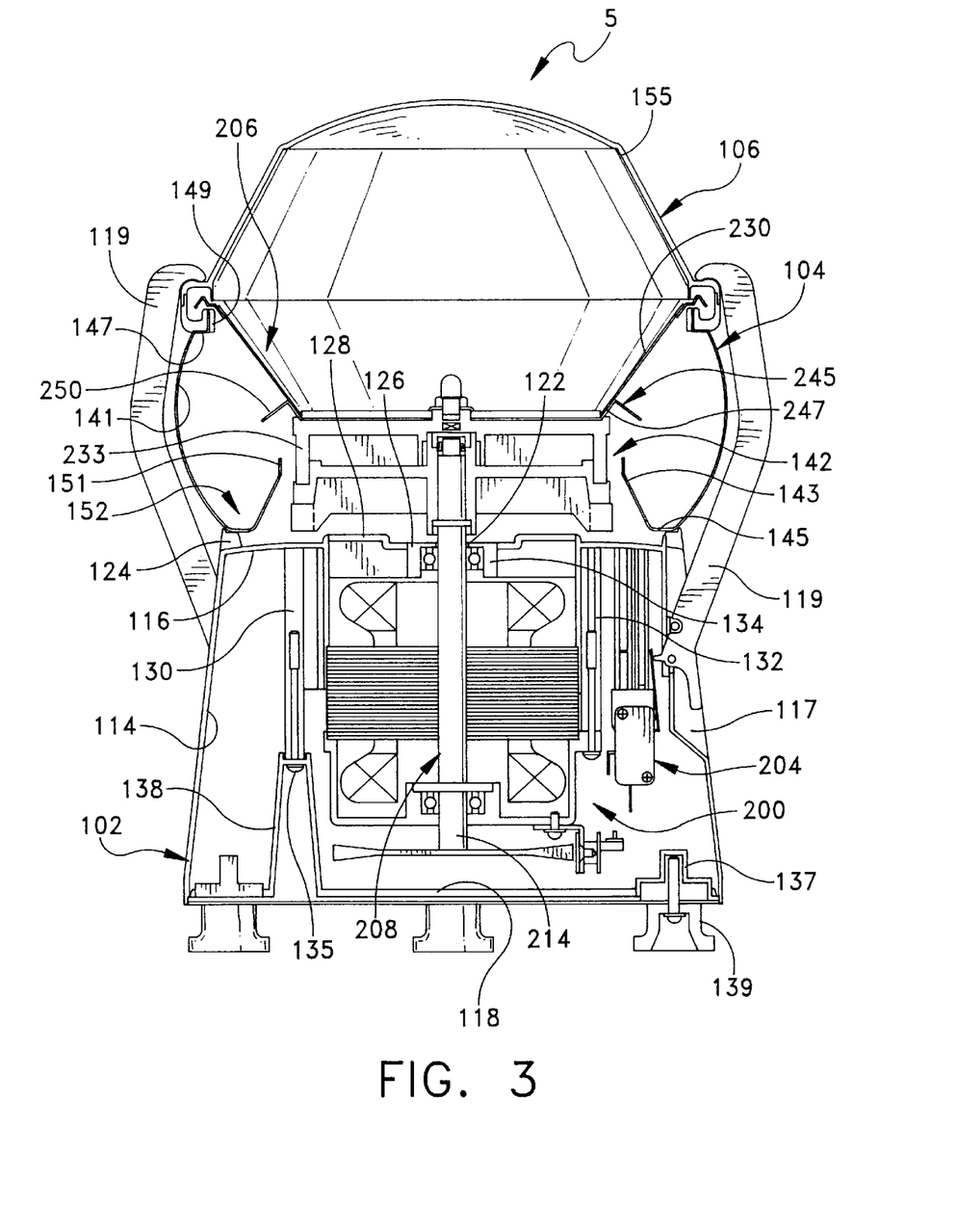
FIG. 3 is a cross-sectional view of the juicer shown in FIG. 2, as taken along line 3—3 in FIG. 2.

Referring now to FIGS. 1–7, cover 106 is preferably formed from a transparent or translucent polymer material of the type suitable for use with food products, and a dome 155, a pulp chute 157, and an access port 159. More particularly, dome 155 is sized and shaped to completely cover opening 142 and trough 152 of collection bowl 104. A semi-annular slotted edge 161 extends around about two-thirds of dome 155, and is adapted to sealingly and releasably receive cylindrical lip 149, when dome 155 is placed into engagement with inwardly projecting seat 147 of collection bowl 104 (FIG. 3). A bracket 163, having a through-bore 165, is disposed on a rearward portion of each side edge of dome 155. Bracket 163 is adapted for interconnection with means for holding a pulp collection receptacle, as will hereinafter be disclosed in further detail.

Figure 6:
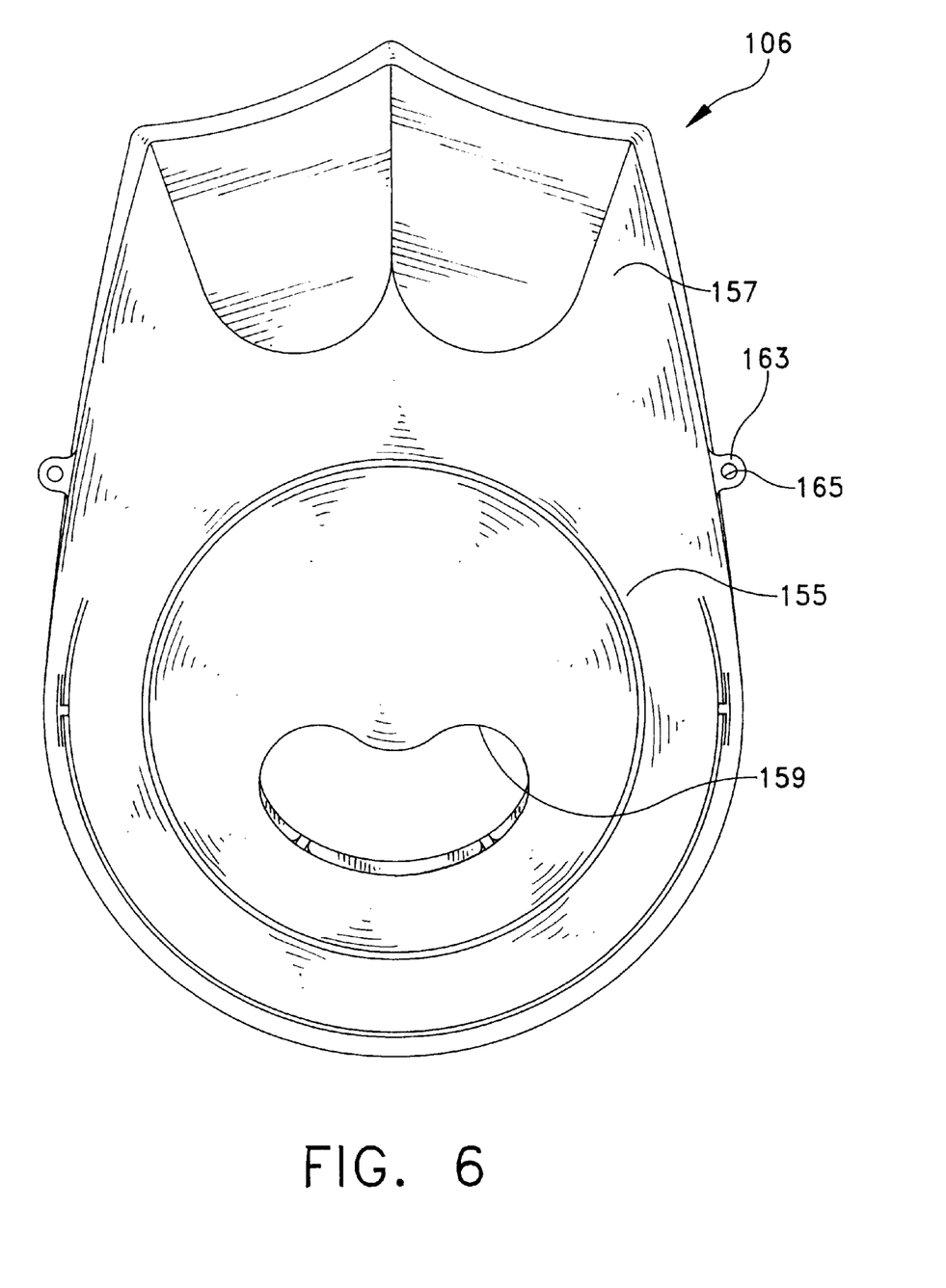
FIG. 6 is a top view of the cover of the juicer shown in FIG. 1.
Figure 7:
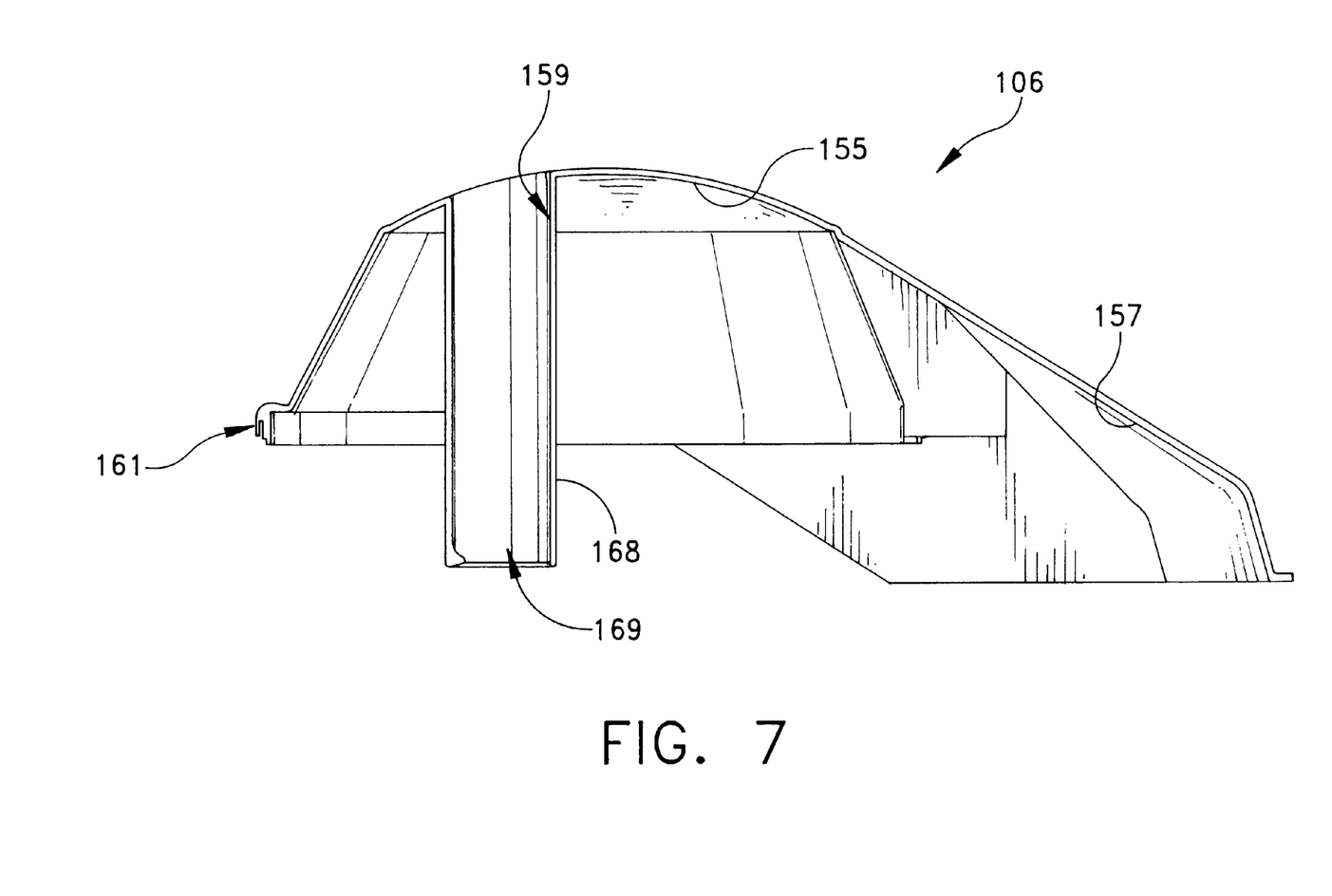
FIG. 7 is a cross-sectional view of the cover shown in FIG. 6, as taken along line 7—7 in FIG. 6.

Access port 159 is defined within the top surface of dome 155, and is in open communication with the interior of an access tube 168. Access tube 168 includes an exit opening 169. Access port 159 and access tube 168 are sized and shaped so as to easily receive large portions of fruits and/or vegetables during the comminution process. Pulp chute 157 slopes downwardly from the rear of dome 155 so as to form a cowl. Pulp chute 157 provides a directional barrier which guides pulp ejected from pulping assembly 200 into a pulp receptacle, as will be hereinafter be disclosed in further detail.

Figure 8:
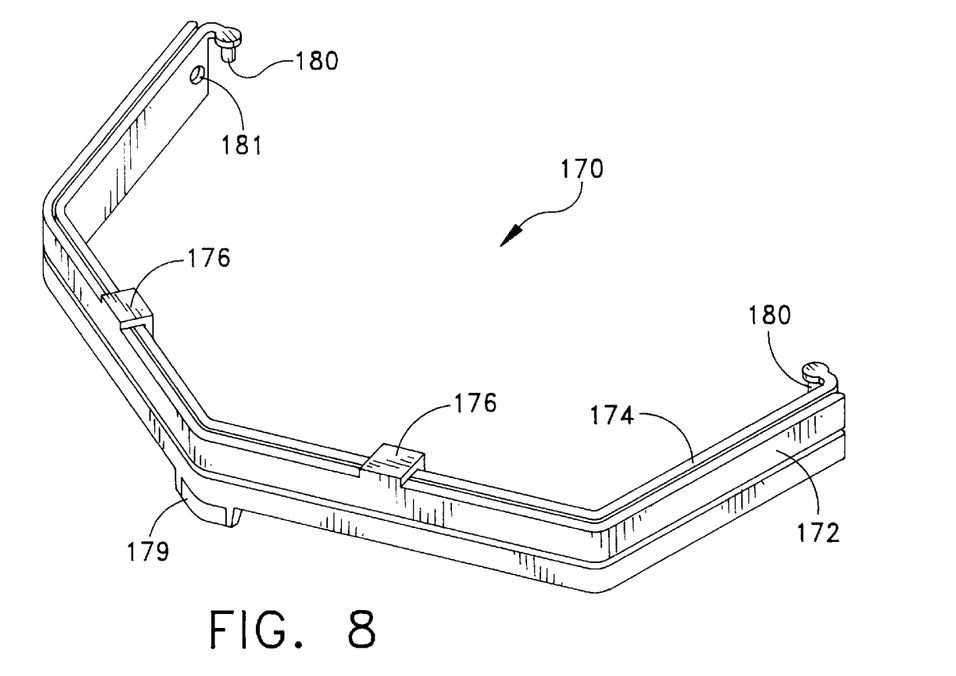
FIG. 8 is a perspective view of a pulp bag hanger formed in accordance with one embodiment of the present invention.
Figure 9:
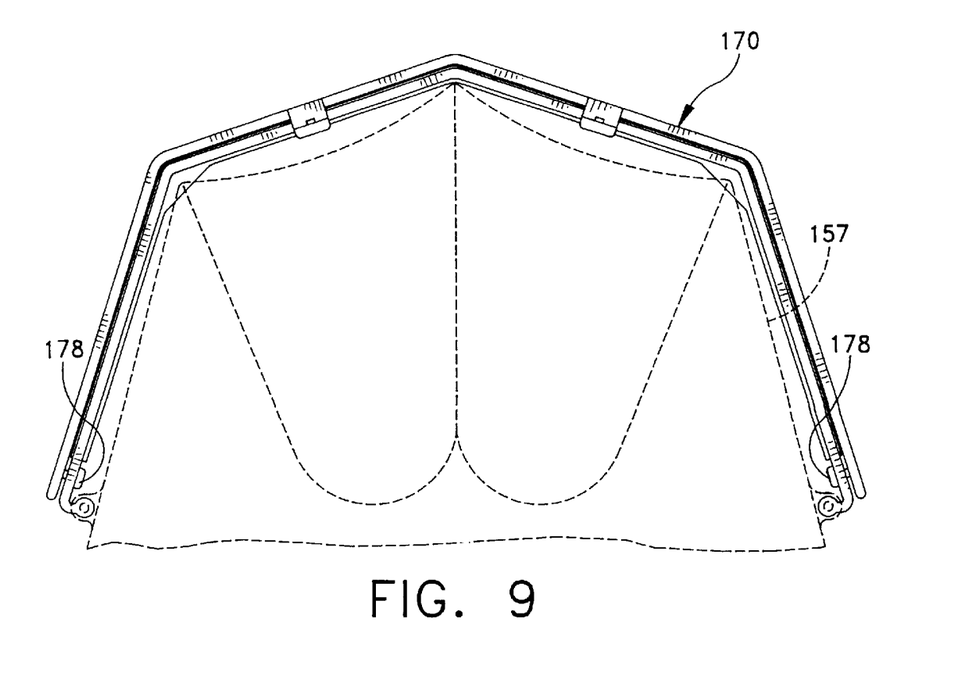
FIG. 9 is a bottom view of the pulp hanger shown in FIG. 1, with a portion of the cover broken away and shown in phantom.

Referring to FIGS. 8 and 9, in one preferred embodiment of the present invention, juicer 5 includes a pulp bag hanger 170 which may be releasably affixed to the rear portion of dome 155. Pulp bag hanger 170 is adapted for releasably maintaining a conventional trash bag in position below pulp chute 157 (replacing pulp receptacle 108) so as to capture pulp ejected from pulping assembly 200. More particularly, pulp bag hanger 170 comprises a substantially semi-circular outer jaw 172 and a substantially semi-circular inner jaw 174. Pulp bag hanger 170 may comprise various shapes having semi-circular symmetry, such as semi-octagonal, semi-hexagonal, etc., without departing from the novel aspects of the present invention.

Figure 10:
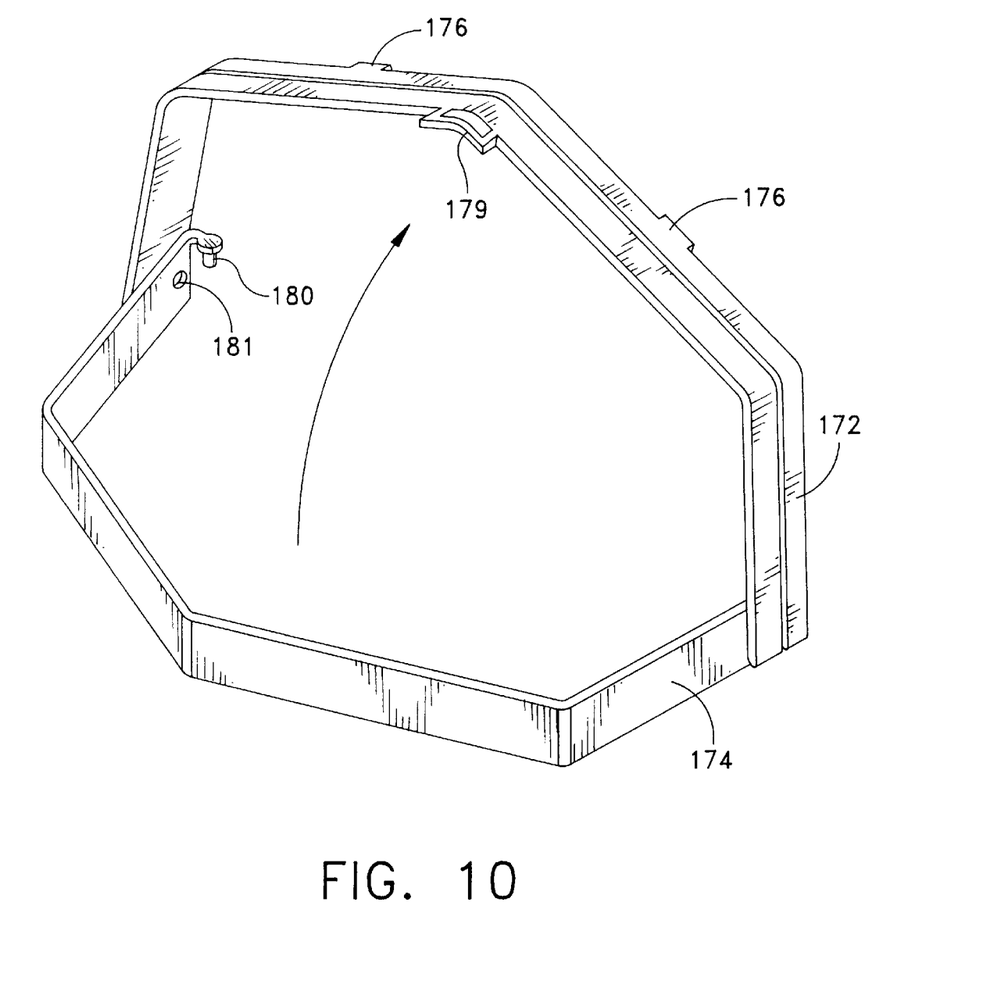
FIG. 10 is a perspective view of the pulp hanger shown in FIGS. 8 and 9, with the jaws arranged in an open position, ready to receive a portion of a trash bag.

Outer jaw 172 includes a pair of spaced-apart, inwardly projecting channel-shaped stops 176 disposed on a top edge. A pair of diametrical opposed pivot studs 178 project inwardly from a position adjacent to each free end of outer jaw 172. Stops 176 comprise a pair of truncated channels that open downwardly. Of course, other types of stops may be used with less preferred results, such as, round studs or relatively flat plates. A finger grip 179 projects downwardly from a portion of outer jaw 172. Inner jaw 174 corresponds in shape to outer jaw 172, and includes an integral mounting stud 180 that projects downwardly from each free end. A through-bore 181 is defined through inner jaw 174 adjacent to each mounting stud 180. Through-bore 181 is adapted for receiving pivot studs 178 of outer jaw 172. When assembled to one another, outer jaw 172 and inner jaw 174 pivot relative to one another, about pivot studs 178, such that outer jaw 172 can be rotated upwardly approximately 60 to 90 degrees away from lower jaw 174 so that pulp bag hanger 170 may receive an outer edge of a conventional trash bag. The pivoting rotation of outer jaw 172 relative to inner jaw 174 is facilitated by finger grip 179. Outer jaw 172 then may be rotated toward inner jaw 174 so as to be disposed in fully confronting relationship to inner jaw 174, with channel shaped stops 176 receiving a portion of inner jaw 174. In this way, the conventional trash bag is captured within pulp bag hanger 170. Once the trash bag is filled with pulp, the operator need only rotate outer jaw 172 away from inner jaw 174 to release the conventional trash bag for disposal.

Figure 4:
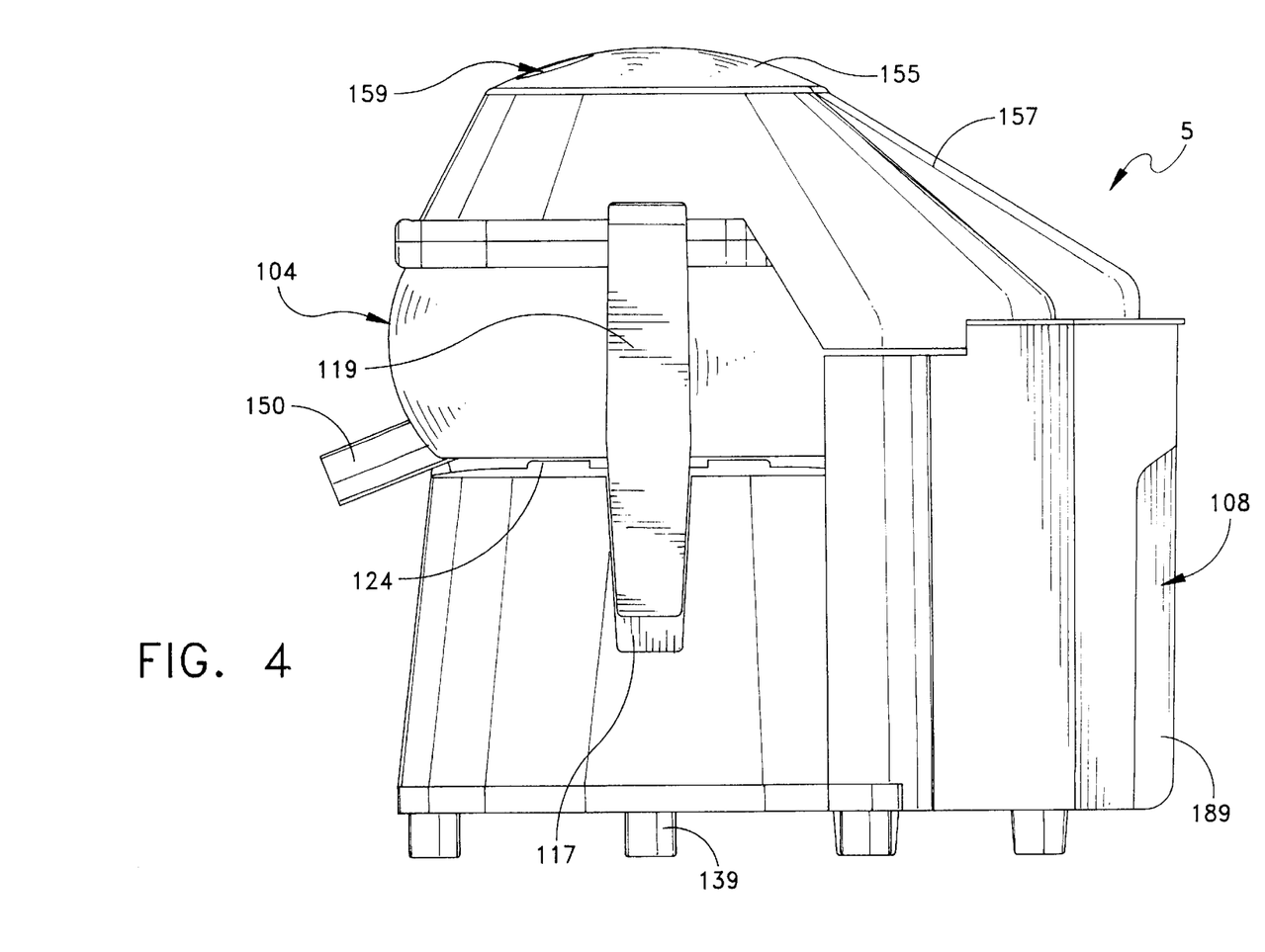
FIG. 4 is a side elevational view of the juicer shown in FIG. 1.
Figure 5:
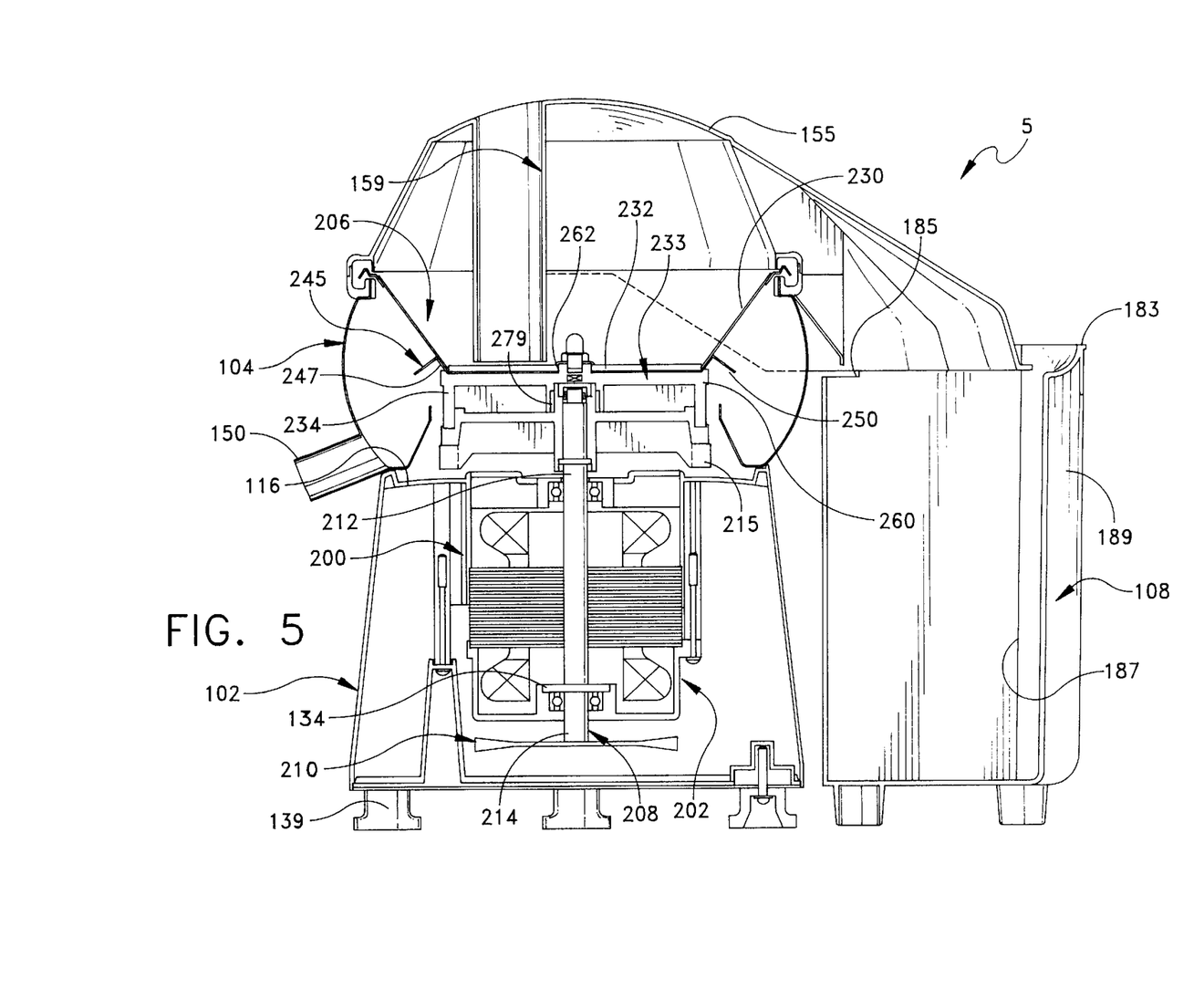
FIG. 5 is a cross-sectional view of the juicer shown in FIG. 4, as taken along line 5—5 in FIG. 4.

Referring to FIGS. 4 and 5, pulp receptacle 108 comprises an open ended container that is shaped so as to be fully covered by the cowl of pulp chute 157. Pulp receptacle 108 includes an upper edge 183 having a stop shoulder 185 disposed at the rear most portion of upper edge 183 and an interior chamber 187 that is sized to receive pulp from pulp chute 157. A hand grip 189 is positioned longitudinally along a back edge of pulp receptacle 108 for easy handling.

Referring to FIGS. 3, 5, 10–16, pulping assembly 200 comprises an induction motor 202, a servo-control means 204, and a basket assembly 206. More particularly, induction motor 202 comprises stator and rotor conductors, a drive shaft 208, and a taco-blade 210. Induction motor 202 is of the type well known in the art in which the motor function is produced by the rotation of magnetic fields. Generally, a rotating magnetic field is formed in the air gap between the stator and rotor. The field rotates at a synchronous speed. As the magnetic field rotates, it "cuts" the rotor conductors. By this process, voltages are induced in the conductors. The induced voltages give rise to rotor currents which interact with the air gap field to produce a torque. The torque is maintained as long as the rotating magnetic field and the induced rotor current exist. The rotor starts rotating in the direction of the rotating field, and normally achieves a steady-state speed. In connection with the present invention, the induction motor manufactured by Man Pyong Electorics Co., of South Korea, Part No. J2-M35.  has been found to yield adequate results.

Drive shaft 208 extends from the axial ends of induction motor 202 and comprises a first end 212 and a second end 214. First end 212 is adapted to receive a support platen 215 when induction motor 202 is mounted within base housing 102. In this position, first end 212 of drive shaft 208 extends outwardly from top wall 116. Platen 215 comprises a central through-bore which is sized to receive the end of drive shaft 208. Platen 215 is affixed to first end 212 of drive shaft 208 by screws, nuts and bolts, or by a press fit.

Referring to FIGS. 3, 5, 10 and 11, servo-control means 204 comprise a taco-blade 210 and a servo-counter 219. More particular, servo-control means 204 comprises an automatic feedback control system adapted for controlling induction motor 202. Servo-control means 204 provides an accurate control of the torque output of induction motor 202 as mechanical load variations are encountered by pulping assembly 200. In accordance with a preferred embodiment of the present invention, taco-blade 210 comprises a disk having a central through-bore sized to accept second end 214 of drive shaft 208 (FIG. 3). Taco-blade 210 includes a plurality of circumferentially disposed, radially outwardly projecting blades 221. Taco-blade 210 preferably comprises about 80 individual blades 221. Taco-blade 210 also functions as a cooling fan to maintain induction motor 202 at a preferred temperature. Servo-counter 219 is disposed in close proximity to the end edges of blades 221 of taco-blade 210. Servo-counter 219 is adapted to provide a signal to a servo-control circuit 223 each time a blade 221 passes the counter. For example, servo-counter 219 may comprise magnetic or optical means that interact with the individual blades 221 as each passes a portion of servo-counter 219, e.g., by induction coil or photo cell. Such means of detection of repetitive motion are well known in the art and would be readily available to those skilled in the art.

Figure 11:
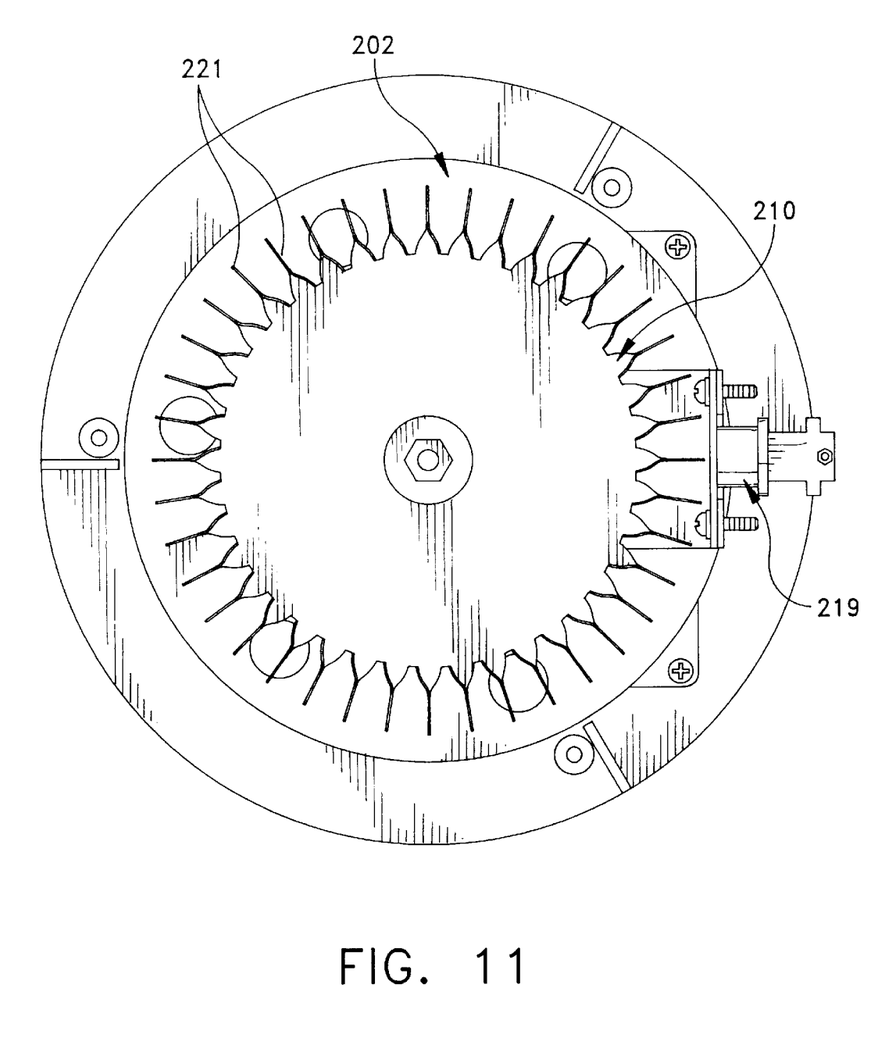
FIG. 11 is a bottom view of the juicer showing a taco-blade and servo-counter.
Figure 12:
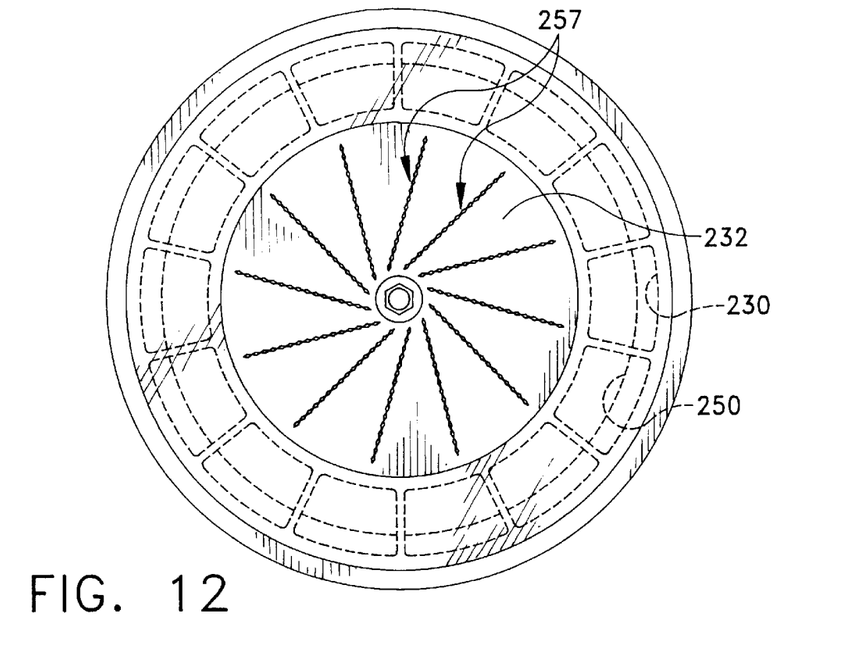
FIG. 12 is a top view of the basket assembly shown in FIGS. 1–5.

Servo-control means 204 receives the signals generated by blades 221 passing servo-counter 219, and thereby calculates the angular velocity of drive shaft 208 at any given instant in time. The electronic circuitry used in connection with servo-control means 204, taco-blade 210 and servo-counter 219 is preferably implemented using a combination of integrated circuits, transistors, thyristers and the like or modular combinations thereof, that are adapted for use in controlling an induction motor of the type described herein. The function of each circuit or component or module is fully described by literature supplied by the manufacturers of these types of components, and the manner in which the circuitry operates to control an induction motor would be obvious to one skilled in the art of electronics.

In the preferred embodiment, servo-control means 204 monitors the revolutions per minutes of drive shaft 203 caused by the operation of induction motor 202. Servo-control means 204 adjusts the current and voltage applied to induction motor 202 in order to maintain the revolutions per minute constant. Induction motor 202, when operating for optimal efficiency, causes drive shaft 208 to revolve at about 3,550 revolutions per minute (rpm). Under a no load condition, i.e., with no fruits and/or vegetables being placed into the juicer for comminuting, the servo-control circuit will provide 80 volts at 2 amperes to induction motor 202. At this level, induction motor 202 will provide 2.0 kilogram-centimeters of torque. However, as a load is applied to the juicer, i.e., as fruits and/or vegetables engage pulping assembly 200, drive shaft 208 slows in reaction to the frictional forces created by engagement of the fruits and/or vegetables with pulping assembly 200. Servo-control means 204 monitors the reduction in rpm of drive shaft 208, via servo-counter 219 and taco-blade 210. As the decrease of rotational speed is detected, servo-control means 204 operates to increase the voltage (and current) applied to induction motor 202 so as to maintain the optimal 3,550 rpm of drive shaft 208. In a preferred embodiment of the present invention, the total voltage range available is 40 volts, i.e., between 80 volts and 120 volts, at between 2 and 7 amperes.

Referring to FIGS. 3, 5, and 12–16, basket assembly 206 comprises a screen 230, a blade 232, and a blade support 233. More particularly, screen 230 comprises a frusto-conically shaped, fine mesh sieve that is particularly adapted for separating pulp from juice during centerfuging. Screen 230 is fixed to a screen support platen 234 so that the narrow portion of the frustum is attached to support platen 234. Screen support platen 234 comprises a circular plate having an upper surface 238, a lower surface 239, a central bore 241, and an annular splash guard 245. Screen support platen 234 is preferably formed from a substantially rigid material that is suitable for use with food products, such as stainless steel, or the like.

Figure 14:
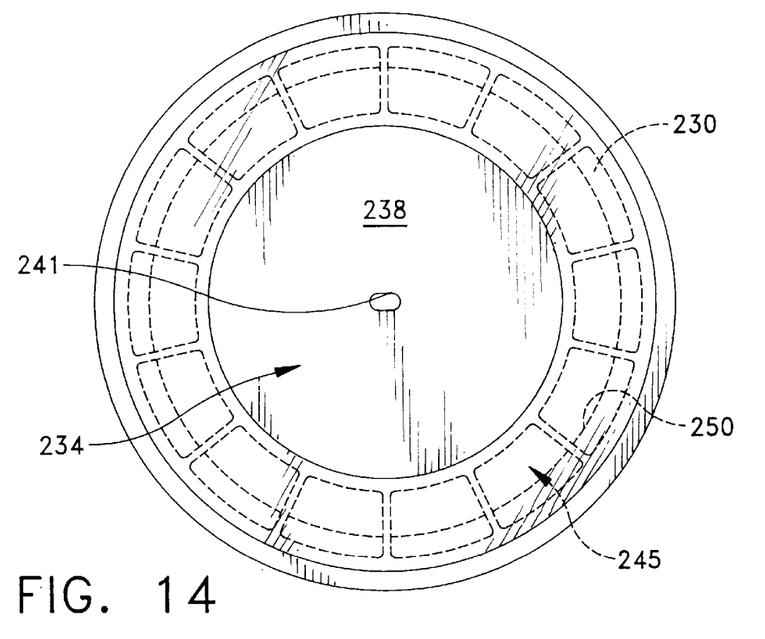
FIG. 14 is a top view of a screen and screen support.
Figure 15:
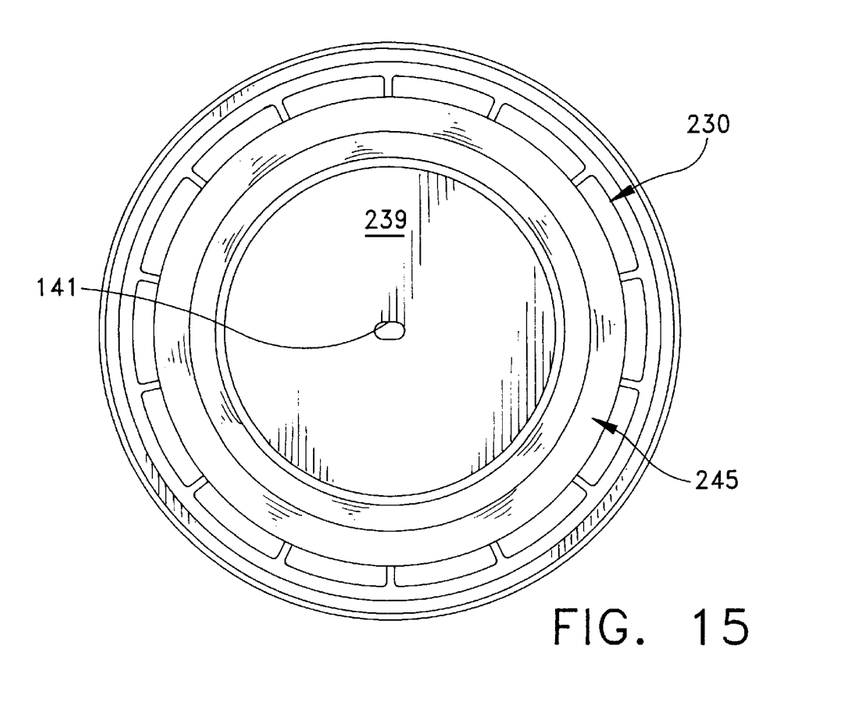
FIG. 15 is a bottom view of a screen and screen support shown in FIG. 14.

Annular splash guard 245 is disposed on the perimeter of screen support platen 234 and comprises an upwardly and outwardly projecting leg 247 and a downwardly and outwardly projecting lip 250. Lip 250 projects perpendicularly from the free end of leg 247, and cooperates with cylindrical lip 151 and inner wall 143 of collection bowl 104 to significantly reduce the quantity of juice splashing into base housing 102. Central bore 241 is preferably non-circular in shape, and is normally elongated.

Figure 13:
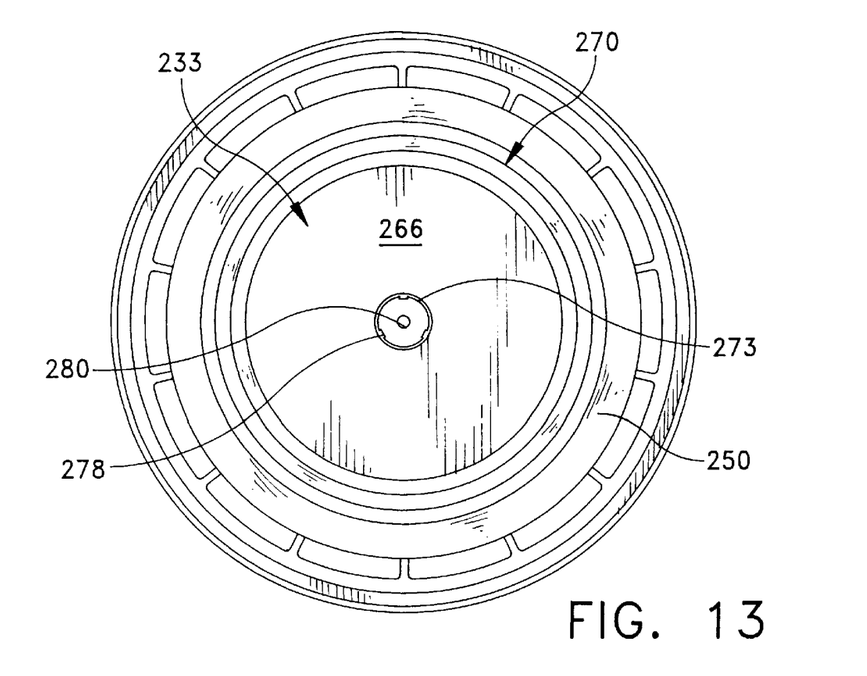
FIG. 13 is a bottom view of the basket assembly shown in FIG. 12.
Figure 16:
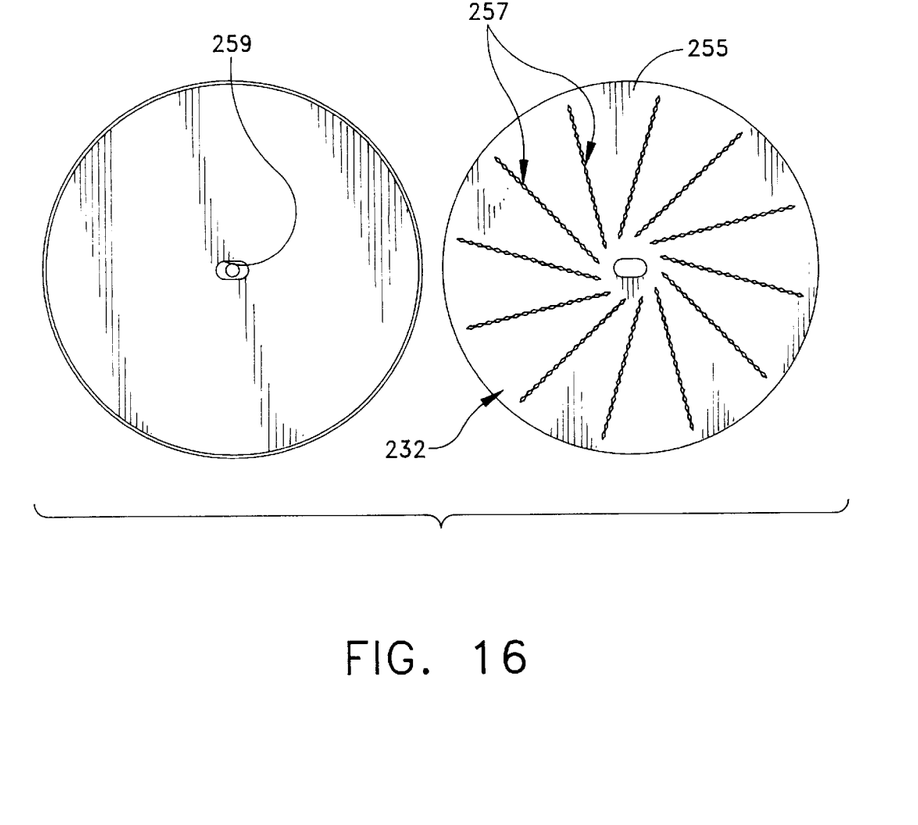
FIG. 16 is a blade and blade support.

Blade 232 comprises a substantially flat, thin plate 255 having plurality of cutting edges 257 projecting upwardly from a top surface (FIG. 16). Blade 232 also includes a central through-bore 259 that is sized and shaped similarly to bore 241. Blade 232 has a diameter sized to fit onto screen support upper surface 238, within the perimeter defined by angular splash guard 245. Blade support 233 comprises a circular disk having a peripheral shoulder 260 and a central annular elongate embossment 262 that projects upwardly from the upper surface of blade support 233 (FIG. 5). Bottom surface 266 of blade support 233 includes a plurality of concentric shoulders 270 that surround a central cylindrical hub 273 (FIG. 13). Central cylindrical hub 273 includes 3 circumferentially equi-distant protrusions 278 that project radially inwardly toward a central through-bore 280.

The juicer of the present invention is assembled as follows. Induction motor 202 is first disposed within base housing 102 such that first end 212 of drive shaft 208 projects outwardly from central bore 122 of top wall 116. Induction motor 202 is then secured within base housing 102 by attachment to motor mount 132. It will be understood that drive shaft 208 has taco-blade 210 attached to it prior to installation in base housing 102. Servo-control means 204 are similarly mounted within base housing 102, and electrically interconnected to servo-counter 219, e.g., by wires, circuit boards, and/or connectors of the type known in the electrical interconnection arts. Once induction motor 202 and servo-control means 204 are securely mounted within base housing 102, bottom wall 118 is secured to base housing 102, via housing mounts 138. Footpads 139 may then be affixed to footpad mounts 137 of bottom wall 118.

Referring to FIGS. 1–4, base housing 102 is set upon footpads 139 so that first end 212 of drive shaft 208 is easily accessible. Once in this position, basket assembly 206 may be assembled to the juicer. More particularly, screen 230 is first oriented so that lower surface 239 is disposed in confronting relationship with the upper surface of blade support 233. Once in this position, screen 230 is moved toward blade support 233 until central embossment 262 enters central bore 241. It should be understood that once central embossment 262 enters central bore 241, screen 230 is incapable of rotation relative to blade support 233 due to the complementary elongate shapes of central bore 241 and central embossment 262.

Next, blade 232 is oriented such that plurality of cutting edges 257 project upwardly. Once in this position, blade 232 is moved toward screen support platen 234 until central embossment 262 of blade support 233 enters central bore 259. Once in this position, basket assembly 206 may be affixed to first end 212 of drive shaft 208. More particularly, basket assembly 206 is positioned so that central cylindrical hub 273 is disposed in opposed confronting relation with first end 212 of shaft 208. Once in this position, basket assembly 206 is moved toward base housing 102 until first end 212 of shaft 208 enters central cylindrical hub 273. Basket assembly 206 is then fixed to first end 212 of shaft 208 by a screw or nut as is well known in the art.

It will be understood that protrusions 278 engage corresponding longitudinally oriented recesses 279 that are formed on a protruding central portion of platen 215 such that rotational energy may be transferred from drive shaft 208 to basket assembly 206. Advantageously, the engagement of protrusions of 278 with corresponding recesses reduces the stack up of tolerances between the two assemblies improving the transfer of rotational energy from induction motor 202 to blade 232.

With pulping assembly 200 assembled to base housing 102, collection bowl 104 may be placed into position. More particularly, collection bowl 104 is oriented such that cylindrical lip 149 projects upwardly with base 145 in confronting coaxial relationship with peripheral shoulder 124. Once in this position, collection bowl 104 is moved toward base housing 102 until base 145 engages the upper surface of peripheral shoulder 124. It will be noted that in this position spout 150 is oriented substantially in the front of base housing 102.

Cover 106 is disposed on collection bowl 104 as follows. Dome 155 is oriented so as to be disposed in confronting relation to blade 232 of basket assembly 206. In this position, semi-annular slotted edge 161 is disposed in coaxial confronting relation with cylindrical lip 149 of collection bowl 104. From this position, cover 106 is moved toward collection bowl 104 until cylindrical lip 149 enters semi-annular slotted edge 161. It will be noted that in this position, pulp chute 157 is disposed over the rear of base housing 102. To complete the assembly, pulp receptacle 108 is disposed under the cowl of pulp chute 157. Alternatively, a conventional trash bag may be positioned within pulp bag hanger 170, as was hereinabove described, in which case, pulp receptacle 108 is not utilized.

Once assembled, pivoting latch arms 119 are pivoted so that their upper gripping ends engage the side edges of cover 106. Pivoting latch arms 119 are then pulled downwardly, so that cover 106 is pulled into tight engagement with collection bowl 104.

The juicer of the present invention is operated by providing electrical energy, via a conventional electrical cord and on/off switch disposed on base housing 102, to induction motor 202 via servo-control means 204. As this occurs, basket assembly 206 is caused to rotate at approximately 3,550 rpm. Fruits and/or vegetables are placed into engagement with blade 232, via access port 159. It will be understood that the lower edge of access tube 168 is disposed in non-contacting adjacent relation to blade 232. Fruits and/or vegetables are then pressed into engagement with plurality of cutting edges 257 by means of a plunger 300 as is well known in the art. This in turn causes the fruits and/or vegetables to be comminuted and spun into engagement with screen 230, where juice is extracted from pulp by centrifugal forces. Advantageously, the angular orientation of screen 230, relative to blade 232, causes the pulp to be ejected upwardly into engagement with dome 155 and directed into either pulp receptacle 108 or the conventional trash bag attached to pulp bag hang 170, by pulp chute 157.

The invention having been disclosed in connection with the foregoing variations and examples, additional variations will now be apparent to persons skilled in the art. The invention is not intended to be limited to the variations specifically mentioned and accordingly, reference should be made to the appended claims rather than the foregoing discussion of preferred examples to access the scope of the invention in which exclusive rights are claimed.

What is claimed is:

1. A juice extractor comprising:
    a housing;
    an induction motor supported by said housing and having a rotatable shaft;
    means for (i) comminuting food products so as to pulverize said food products into juice bearing pulp, (ii) extracting juice from said pulp, and (iii) ejecting said juiceless pulp, said comminuting means disposed in operative engagement with said shaft;
    servo-control means arranged in electrical and controlling cooperation with said induction motor and responsive to the rate of rotation of said shaft for maintaining said shaft at a substantially constant rate of rotation when said induction motor is in a power-on state and said comminuting means are comminuting said food products;
    a bowl positioned in substantially surrounding relation to said comminuting means so as to (i) collect said juice and (ii) direct said juice to an exit opening; and
    a cover releasably clamped to said collection bowl, said cover having a contour that provides a pathway for directing pulp ejected by said comminuting means into a receptacle.

2. A juicer according to claim 1 wherein said servo-control means include a taco-blade fastened to an end of said shaft so as to rotate in unison with said shaft, said taco-blade having at least one periodically detectable feature and a servo-counter positioned adjacent to said taco-blade for detecting said at least one periodically detachable feature of said taco-blade and thereby determining the rate of rotation of said shaft.

3. A juicer according to claim 2 wherein said servo-counter provides a signal to a servo-control circuit each time said at least one periodically detectable feature passes said servo-counter and said servo-control circuit operates to maintain an optimal rotation rate of said shaft by adjusting the voltage applied to said induction motor.

4. A juicer according to claim 3 wherein said taco-blade comprises a disk having a central through-bore sized to accept an end of said shaft and a plurality of circumferentially disposed, radially outwardly projecting blades and said servo-counter is disposed in close proximity to the end edges of said blades of said taco-blade.

5. A juicer according to claim 3 wherein said servo-counter includes magnetic or optical means for detecting said at least one periodically detectable feature of said taco-blade.

6. A juicer according to claim 3 wherein said servo-control means receives at least one periodic signal, and thereby calculates the angular velocity of said shaft.

7. A juicer according to claim 1 wherein said servo-control means monitors the revolutions per minutes of said shaft caused by the operation of said induction motor and adjusts the current and voltage applied to said induction motor in order to maintain the revolutions per minute constant.

8. A juicer according to claim 7 wherein said induction motor, when operating for optimal efficiency in said power-on state, causes said shaft to rotate at about 3,550 revolutions per minute.

9. A juice extractor comprising:
    a housing;
    an induction motor supported by said housing and having a rotatable shaft;
    means for (i) comminuting food products so as to pulverize said food products into juice bearing pulp, (ii) extracting juice from said pulp, and (iii) ejecting said juiceless pulp, said comminuting means disposed in operative engagement with said shaft;
    servo-control means arranged in electrical and controlling cooperation with said induction motor and responsive to the rate of rotation of said shaft for maintaining said shaft at a substantially constant rate of rotation when said induction motor is in a power-on state and said comminuting means are comminuting said food products;
    a bowl positioned in substantially surrounding relation to said comminuting means so as to (i) collect said juice and (ii) direct said juice to an exit opening; and
    a cover releasably clamped to said collection bowl, said cover having a contour that provides a pathway for directing pulp ejected by said comminuting means into a receptacle releasably held adjacent to said pathway by a pulp bag hanger comprising a substantially semi-circular outer jaw and a substantially semi-circular inner jaw that are operable to clamp a portion of said receptacle.

10. A juicer according to claim 9 wherein said outer jaw includes a pair of spaced-apart, inwardly projecting channel-shaped stops disposed on a top edge and a pair of diametrically opposed pivot studs that project inwardly from a position adjacent to a free end of said outer jaw.

11. A juicer according to claim 10 wherein said stops comprise a pair of truncated channels that open downwardly and said outer jaw further includes a finger grip that projects downwardly from a lower edge.

12. A juicer according to claim 11 wherein said inner jaw comprises a complementary shape to said outer jaw, and includes an integral mounting stud that projects downwardly from a free end and a through-bore that is defined through said inner jaw adjacent to each mounting stud wherein said through-bore is adapted for receiving said pivot studs of outer jaw.

13. A juicer according to claim 12 wherein said outer jaw and said inner jaw pivot relative to one another, about said pivot studs such that said outer jaw can be rotated upwardly away from said lower jaw so that an outer edge of a conventional trash bag may be positioned therebetween and said outer jaw then may be rotated toward said inner jaw so as to be disposed in fully confronting relationship to said inner jaw, with said channel shaped stops receiving a portion of said inner jaw thereby capturing said conventional trash bag.

14. A juice extractor comprising:

a housing;

an induction motor supported by said housing and having a rotatable shaft;

means for (i) comminuting food products so as to pulverize said food products into juice bearing pulp, (ii) extracting juice from said pulp, and (iii) ejecting said juiceless pulp, said comminuting means disposed in operative engagement with said shaft;

servo-control means arranged in electrical and controlling cooperation with said induction motor and responsive to the rate of rotation of said shaft for maintaining said shaft at a substantially constant rate of rotation when said induction motor is in a power-on state and said comminuting means are comminuting said food products;

a bowl positioned in substantially surrounding relation to said comminuting means so as to (i) collect said juice and (ii) direct said juice to an exit opening, said bowel comprising a vessel having an outer annular wall, an inner annular wall, and an annular base wherein said outer wall comprises a radially outward curvature having a center point that defines a radius of about 45 mm to about 55 mm; and a cover releasably clamped to said collection bowl, said cover having a contour that provides a pathway for directing pulp ejected by said comminuting means into a receptacle.

15. A juicer according to claim 14 wherein said inner annular wall projects upwardly and inwardly an edge of said base, at an angle in the range from about 45 degrees to about 55 degrees relative to base.

16. A juicer according to claim 15 wherein a cylindrical lip projects upwardly from a free end of said inner wall and said base extends between a lower edge of said outer wall and a lower edge of said inner wall so that a relatively broad annular trough is defined by the inner surfaces of said outer wall, said inner wall, and said base.

17. A juice extractor comprising:

a housing;

an induction motor supported by said housing and having a rotatable shaft;

means for (i) comminuting food products so as to pulverize said food products into juice bearing pulp, (ii) extracting juice from said pulp, and (iii) ejecting said juiceless pulp, said comminuting means disposed in operative engagement with said shaft and including a basket assembly comprising a screen and a blade;

servo-control means arranged in electrical and controlling cooperation with said induction motor and responsive to the rate of rotation of said shaft for maintaining said shaft at a substantially constant rate of rotation when said induction motor is in a power-on state and said comminuting means are comminuting said food products;

a bowl positioned in substantially surrounding relation to said comminuting means so as to (i) collect said juice and (ii) direct said juice to an exit opening; and a cover releasably clamped to said collection bowl, said cover having a contour that provides a pathway for directing pulp ejected by said comminuting means into a receptacle.

18. A juicer according to claim 17 wherein said screen comprises a frusto-conically shaped, fine mesh sieve that is particularly adapted for separating pulp from juice during centerfuging, said screen being fixed to a screen support platen so that the narrow portion of said frustum is attached to said support platen and said support platen is operatively engaged with said shaft.

19. A juicer according to claim 18 wherein said screen support platen comprises a circular plate having an upper surface, a lower surface, a central bore, and an annular splash guard disposed on the perimeter of said screen support platen and said central bore is non-circular in shape.

* * * * *